(12) United States Patent
Kilinc et al.

(10) Patent No.: US 10,659,198 B2
(45) Date of Patent: May 19, 2020

(54) PUNCTURE BUNDLING OF DATA FOR A FIRST SERVICE IN A TRANSMISSION OF A SECOND SERVICE

(71) Applicant: TELEFONAKTIEBOLAGET LM ERICSSON (PUBL), Stockholm (SE)

(72) Inventors: Caner Kilinc, Luleå (SE); Shehzad Ali Ashraf, Aachen (DE); Yufei Blankenship, Kildeer, IL (US); Zhan Zhang, Beijing (CN); Zhenhua Zou, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 109 days.

(21) Appl. No.: 16/060,452

(22) PCT Filed: Mar. 19, 2018

(86) PCT No.: PCT/EP2018/056819
§ 371 (c)(1),
(2) Date: Jun. 8, 2018

(87) PCT Pub. No.: WO2018/172245
PCT Pub. Date: Sep. 27, 2018

(65) Prior Publication Data
US 2019/0349136 A1 Nov. 14, 2019

Related U.S. Application Data

(63) Continuation-in-part of application No. PCT/CN2017/077810, filed on Mar. 23, 2017.

(51) Int. Cl.
*H04L 1/18* (2006.01)
*H04L 1/00* (2006.01)
*H04L 5/00* (2006.01)
*H04W 72/04* (2009.01)

(52) U.S. Cl.
CPC ............ *H04L 1/189* (2013.01); *H04L 1/0013* (2013.01); *H04L 1/1819* (2013.01);
(Continued)

(58) Field of Classification Search
CPC ..... H04L 1/189; H04L 5/0082; H04L 5/0055; H04L 5/0044; H04L 1/1819;
(Continued)

(56) References Cited

U.S. PATENT DOCUMENTS

2009/0109999 A1 4/2009 Kuri et al.
2011/0243087 A1* 10/2011 Ahn .................... H04W 52/146
370/329

(Continued)

FOREIGN PATENT DOCUMENTS

WO 2016/126398 A1 8/2016

OTHER PUBLICATIONS

3GPP TR 38.802, V1.0.0, "3rd Generation Partnership Project; Technical Specification Group Radio Access Network; Study on New Radio (NR) Access Technology Physical Layer Aspects—Release 14", Nov. 2016, pp. 1-64.
(Continued)

*Primary Examiner* — Afshawn M Towfighi
(74) *Attorney, Agent, or Firm* — Patent Portfolio Builders PLLC

(57) ABSTRACT

A transmitting node can puncture bundles of data for a first service in a transmission for a second service. The first service has lower latency requirements than the second service. The transmitting node determines data for a first service will be transmitted during a time period when data for a second service will be transmitted, and determines transmission or reception conditions. Based on the determined transmission or reception conditions, the transmitting node determines to adjust the transmission of the first
(Continued)

service. The transmitting node then transmits during the time period the data for the first service while data for the second service is transmitted during the time period, wherein the transmission includes an original set of data for the first service and at least one repetition of the original set of data for the first service.

75 Claims, 11 Drawing Sheets

(52) U.S. Cl.
CPC .......... *H04L 5/0044* (2013.01); *H04L 5/0055* (2013.01); *H04L 5/0082* (2013.01); *H04W 72/0446* (2013.01)

(58) Field of Classification Search
CPC . H04L 1/0013; H04L 1/08; H04L 2001/0098; H04W 72/0446
See application file for complete search history.

(56) References Cited

U.S. PATENT DOCUMENTS

| | | | |
|---|---|---|---|
| 2016/0234857 A1* | 8/2016 | Chen | H04W 72/1231 |
| 2017/0230994 A1 | 8/2017 | You et al. | |
| 2017/0285130 A1* | 10/2017 | Kim | H04L 1/00 |
| 2017/0332369 A1* | 11/2017 | Hosseini | H04L 5/0051 |
| 2018/0227047 A1 | 8/2018 | Hosseini et al. | |
| 2018/0227833 A1 | 8/2018 | Belleschi et al. | |

OTHER PUBLICATIONS

3GPP TS 36.213, V14.0.0, "3rd Generation Partnership Project; Technical Specification Group Radio Access Network; Evolved Universal Terrestrial Radio Access (E-UTRA); Physical layer procedures—Release 14", Sep. 2016, pp. 1-406.

3GPP TSG-RAN WG2 NR Ad Hoc, "Overview of URLLC", Jan. 17-19, 2017, Spokane, Washington, pp. 1-7.

Nokia et al., "On indication for downlink punctured/preemptive scheduling", 3GPP TSG-RAN WG1#88, 3GPP Draft, R1-1703327, Feb. 13-17, 2017, pp. 1-4.

International Search Report and Written Opinion, dated Jun. 4, 2018, from corresponding PCT Application No. PCT/EP2018/056819.

Office Action in related/corresponding U.S. Appl. No. 15/776,953 dated Mar. 19, 2020 (all references not cited herewith have been previously made of record).

* cited by examiner

PUNCTURE BUNDLING OF DATA FOR A FIRST SERVICE IN A TRANSMISSION OF A SECOND SERVICE

BACKGROUND

Wireless communications occur in an environment with unpredictable interference and channel variations. HARQ (Hybrid Automatic Repeat Request) is a common technique used to address the unpredictable interference and channel variations. HARQ involves a wireless device receiving an uplink or downlink transmission to attempt to decode a data message in the transmission.

FIG. 1 is a signaling diagram of a conventional HARQ technique employed between transmitting node 105 and receiving node 110 in an LTE system. Initially, the transmitter 105 transmits up to two transport blocks in a TTI (Transmission Time Interval) to receiving node 110 (step 115). An example of this transmission is illustrated in FIG. 2 in which $TTI_1$ includes two transport blocks and $TTI_2$ includes two transport blocks. Receiving node 110 then determines whether each of the two transport blocks was successfully received (step 120). Because LTE (Long Term Evolution) provides for up to two transport blocks per TTI, the receiving node 110 transmits a HARQ-ACK (ACKnowledgement) consisting of 2 bits, each bit indicating success or failure of a respective transport block, to the transmitting node 105 (step 125).

The transmitter then determines, based on the value of the bits in the HARQ-ACK, whether one or more transport blocks were not successfully decoded (step 130). If so, the transmitting node 105 transmits the unsuccessfully decoded transport block(s) to the receiving node 110 (step 135). The receiving node 110 then attempts to decode the unsuccessfully decoded transport block by soft combining it with the retransmitted transport block (step 140). The type of soft combining can vary, and can involve the well-known Chase or Incremental Redundancy soft combining techniques. Soft combining greatly increases the probability of successful decoding.

LTE, which is a standard in 3GPP family of wireless systems, is highly optimized for MBB (Mobile BroadBand) traffic. The TTI (subframe) has duration of 1 ms and, for FDD (Frequency Division Duplex) the HARQ-ACK is transmitted in subframe n+4 for a data transmission in subframe n.

URLLC (Ultra-Reliable Low Latency Communication) is data service with extremely strict error and latency requirements, including error probabilities as low as $10^{-5}$ or lower and end-to-end latency or lower 1 ms. Other services have similar error and latency requirements, such as the so-called short TTI in LTE.

Although the fifth generation of mobile telecommunications and wireless technology is not yet fully defined, it is in an advanced draft stage within 3GPP and includes work on 5G New Radio (NR) Access Technology. Accordingly, it will be appreciated that although LTE terminology is used in some portions of the disclosure, the disclosure equally applies to equivalent 5G entities or functionalities despite the use of terminology differing from what is specified in 5G. 3GPP TR 38.802 V1.0.0 (2016 November) provides a general description of the current agreements on 5G New Radio (NR) Access Technology and final specifications may be published inter alia in the future 3GPP TS 38.2** series.

MBB or eMBB (enhanced MBB) and URLLC are both among a wide range of data services being targeted for 5G. To enable services with an optimized performance, the TTI lengths are expected to be different for different services, wherein a TTI may correspond to a subframe, a slot, or a mini-slot. Specifically, URLLC may have a shorter TTI length compared to MBB.

Accommodating both MBB and URLLC in the same network introduces conflicts due to the strict latency requirements of URLLC. These conflicts can result in problems decoding either or both of the MBB and URLLC data when the data needs to be transmitted at the same time. Although HARQ is a common way of addressing decoding problems, implementing HARQ in a network accommodating both MBB and URLLC can be difficult due to the strict latency requirements of URLLC. Specifically, although conventional HARQ procedures can be implemented for the MBB data, conventional HARQ procedures likely cannot meet the strict latency requirements of URLLC data.

SUMMARY

Exemplary aspects of the present disclosure are directed to a method implemented in a transmitting node. The transmitting node determines data for a first service will be transmitted during a time period when data for a second service will be transmitted, wherein the data for the first service requires lower latency than the data for the second service. The transmitting node also determines transmission or reception conditions, and based on the determined transmission or reception conditions, determines to adjust the transmission of the first service. The transmitting node then transmits, during the time period, the data for the first service while data for the second service is transmitted during the time period, wherein the transmission includes an original set of data for the first service and at least one repetition of the original set of data for the first service.

Other aspects of the disclosure are directed to a transmitting node for carrying out this method, as well as a computer-readable medium comprising code, which when executed by a processor, causes the processor to perform this method.

An aspect of the disclosure is directed to a method implemented in a receiving node. The receiving node receives a transmission during a time period and determines the transmission includes data for a first service and data for a second service, wherein the data for the first service requires lower latency than the data for the second service. The receiving node also determines the transmission includes an original set of data for the first service and at least one repetition of the original set of data for the first service, and then attempts to decode the data for the first service.

Other aspects of the disclosure are directed to a receiving node for carrying out this method, as well as a computer-readable medium comprising code, which when executed by a processor, causes the processor to perform this method.

DETAILED DESCRIPTION

Figure 3A:
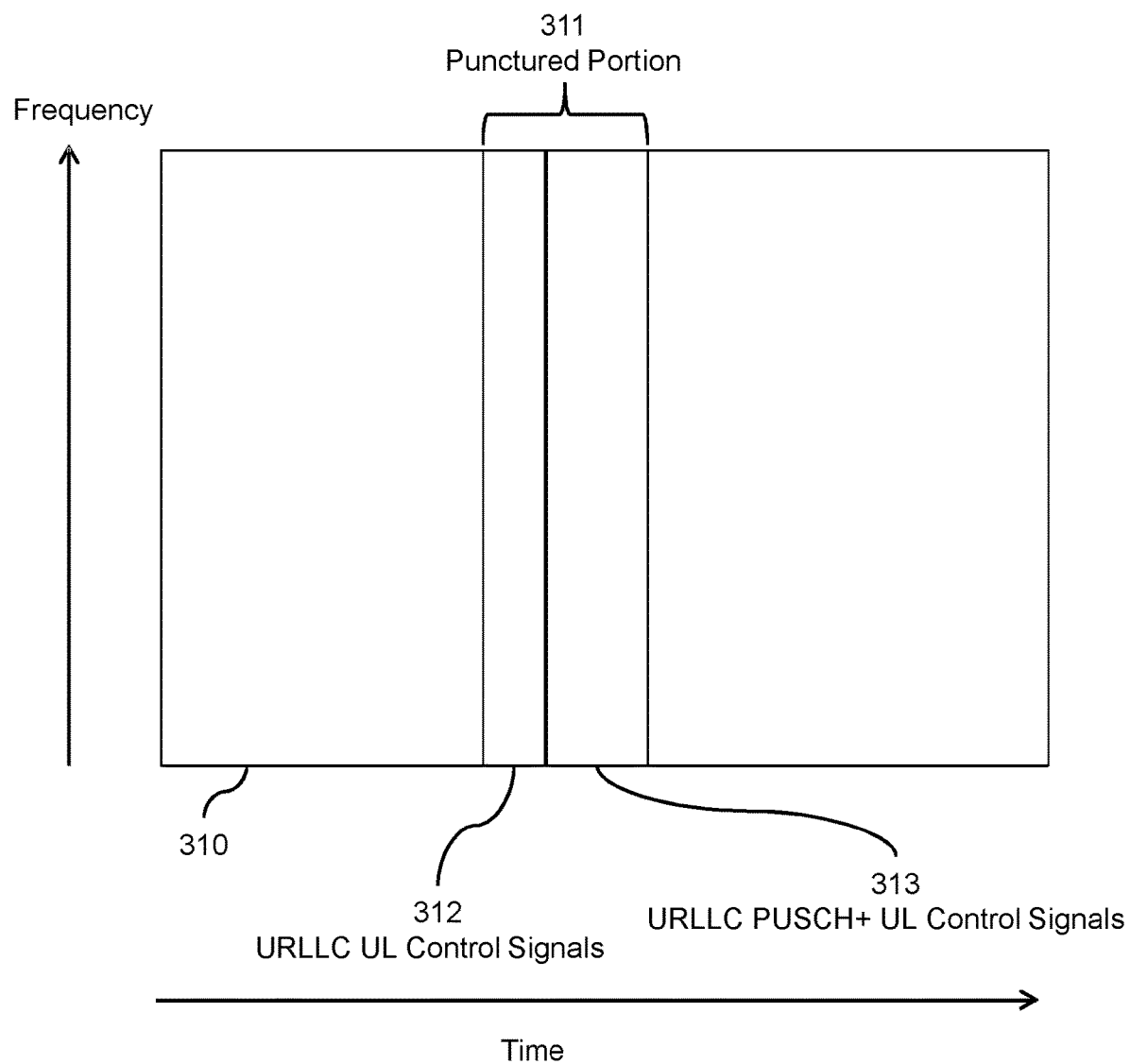
FIGS. 3A and 3B are block diagrams of exemplary punctured uplink and downlink transmissions.
Figure 3B:
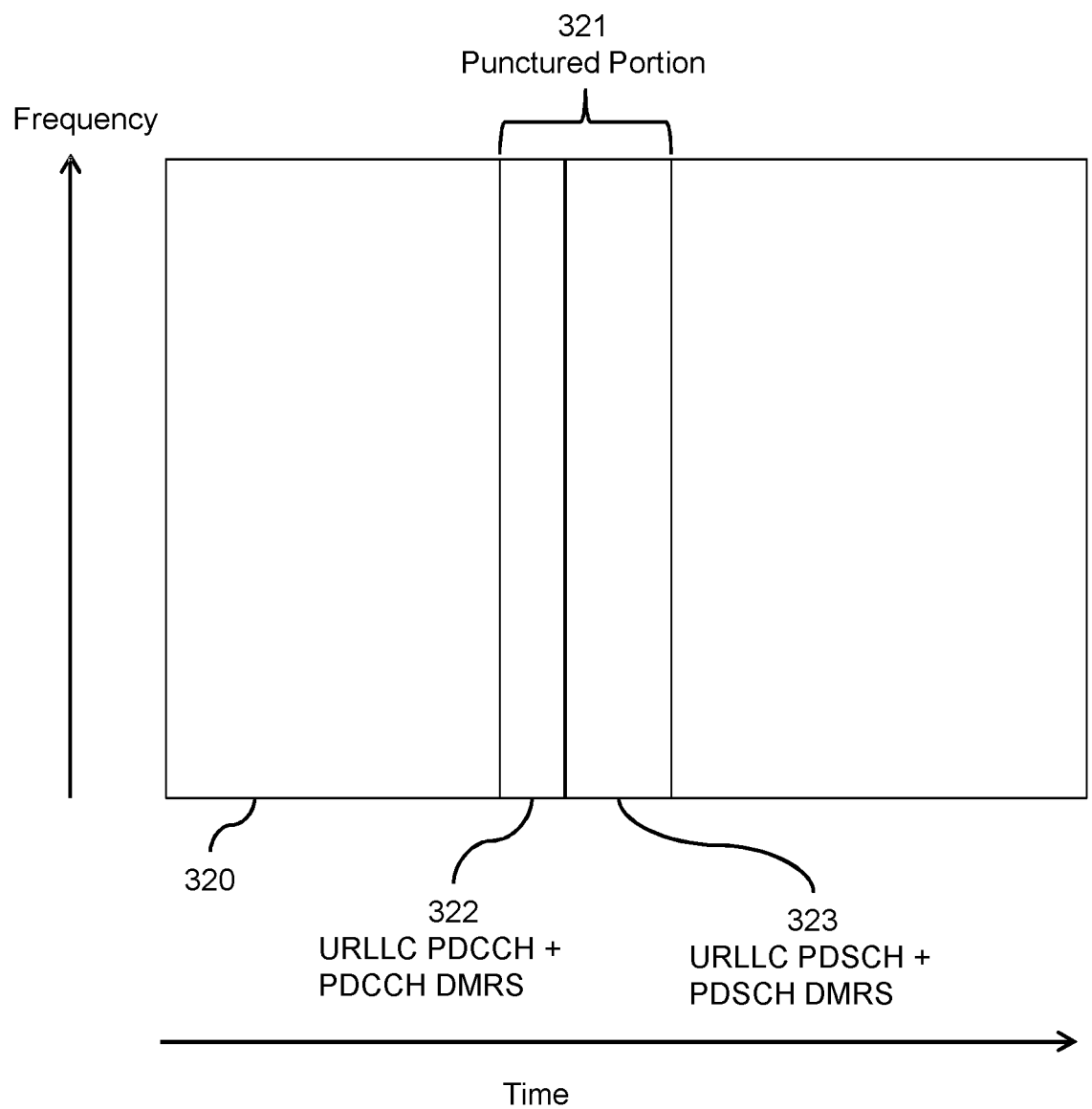

One way to accommodate both URLLC and MBB in the same network is to allow URLLC transmissions to puncture MBB transmissions, examples of which are illustrated in FIGS. 3A and 3B. FIG. 3A illustrates a portion 311 of the time-frequency resources of an uplink MBB transmission 310 being punctured to include an URLLC transmission, i.e., a URLLC uplink control signals portion 312 and a URLLC PUSCH (Physical Uplink Shared Channel) and uplink control signals portions 313. FIG. 3B illustrates a portion 321 of a downlink MBB transmission 320 being punctured to include an URLLC transmission, i.e., a PDCCH (URLLC Physical Downlink Control Channel) and PDCCH DMRS (DeModulation Reference Signal) portion 322 and a URLLC PDSCH and PDSCH (Physical Downlink Shared Channel) DMRS portion 323.

Although this puncturing allows provision of both MBB and URLLC in the same network and allows URLLC transmissions to meet the strict timing requirements, problems can arise in the decoding of the transmitted data. Because MBB transmissions are less time sensitive (compared to URLLC), decoding problems can be addressed using HARQ in a number of different TTIs. For example, in LTE one TTI, which is one subframe, has a duration of 1 ms and for FDD the data originally transmitted during subframe n is retransmitted in subframe n+4. In the LTE uplink the HARQ retransmission timing is fixed and the HARQ retransmission process typically takes 8 ms for each retransmission. This delay may be acceptable for MBB or eMBB because it is less time-sensitive. URLLC, however, is time sensitive and a retransmission separated from the original transmission by up to 8 ms will likely result in the retransmitted data arriving too late for it to be used by the receiver. Accordingly, this conventional HARQ process cannot adequately support URLLC in the same network as MBB. Although this discussion is in connection with URLLC transmissions puncturing MBB transmission, the disclosure is equally applicable to puncturing transmissions of a second service by transmissions of a first service, where the first service is more time sensitive than the second service. In other words, the second service can still be time sensitive, it is just less time sensitive than the first service.

Exemplary embodiments of the present disclosure provide ways to address problems of decoding transmissions for a first service requiring low latency in the same network that may simultaneously transmit for a second service that does not have the low latency requirements as the first service. When a transmitter determines that it cannot adjust transmission parameters, the transmitter can automatically activate puncture bundling without the need for initial control signaling. The puncture bundling involves the transmission of the original data for the first service requiring low latency along with one or more repetitions of the original data, which can be coded the same or differently from the original data, into the same TTI of data transmissions for a second service. In each case, the different redundancy versions or the repeated same redundancy version of the first service punctures the transmissions of the second service. The data of the first service can be punctured into one transport block (TB), two transport blocks, or more than two transport blocks of the data for the second service.

Redundant transmissions of low latency data in a TTI carrying data for a second service eliminates the waiting time between retransmissions normally required due to the transmission of a NACK (Negative ACKnowledgement) and the subsequent retransmission, which allows the low latency data to be successfully decoded while satisfying the latency requirements for the low latency data. This also provides signaling efficiency because it does not require control signaling to carry the NACK (or ACK for successfully decoded data) and provides robustness due to the repetition of data for the low latency service within a TTI of a second service.

FIGS. 4-7 are block diagrams of punctured transmissions with redundancy for low latency data in accordance with exemplary embodiments of the present disclosure. In these examples the original data for the first service and each of the repetitions can be replicas of each other, i.e., the same data coded in the same manner, or the data in each punctured portion can be different versions of each other, i.e., coded differently but carrying the same underlying control and user data that can be recovered after decoding. In the latter case the coding can be taken from a coding list of (0, 3, 2, 1), in which the numbers correspond to redundancy versions that will be used in incremental combining, and if there are more than four repetitions the additional repetitions start again from the beginning of the coding list.

Figure 4:
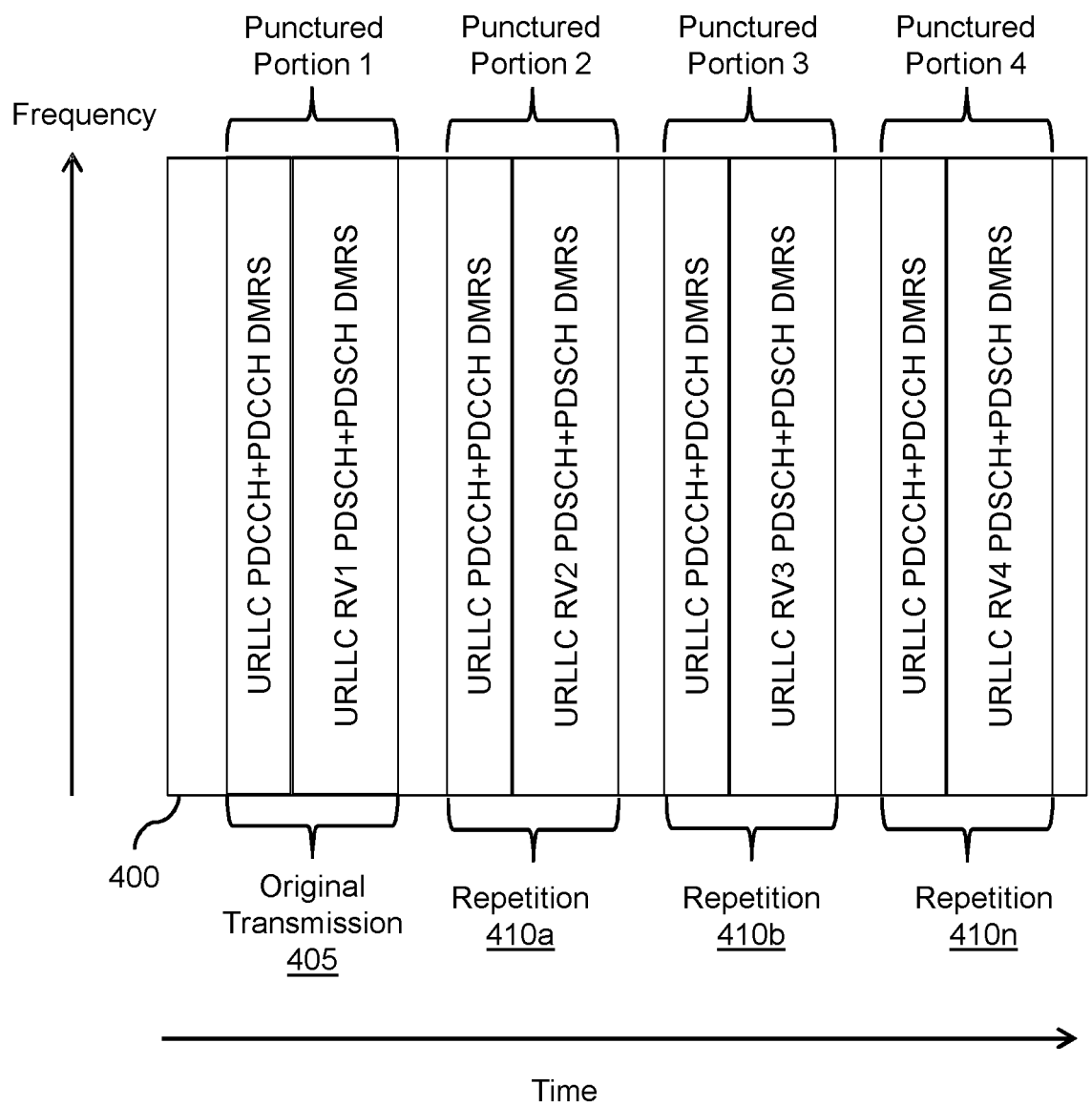
FIG. 4 is a block diagram of a punctured transmission with repeated control data and user data in accordance with exemplary embodiments of the present disclosure.

The transmission in FIG. 4 is a single TTI 400 for the second service, which does not have strict latency requirements, punctured four times by data for the first service, which has strict latency requirements. Specifically, the data for the first service includes an original transmission 405 of control data, which in this example is URLLC PDCCH+PDCCH DMRS, and user data, which in this example is URLLC PDSCH+PDSCH DMRS. The data for the first service also includes three repetitions 410a-410n, each of which includes control data, which in this example is URLLC PDCCH+PDCCH DMRS, and user data, which in this example is URLLC PDSCH+PDSCH DMRS. Although FIG. 4 illustrates an original transmission and three repetitions, the transmission can include a more or fewer repetitions than what is illustrated. The spacing between the original transmission and the first repetition, as well as the spacing between repetitions can be f, which can be greater than or equal to zero. In other words, although a time gap is illustrated in this Figure, the original transmission 405 and repetitions 410a-410n can be directly adjacent to each other in time.

Figure 5:
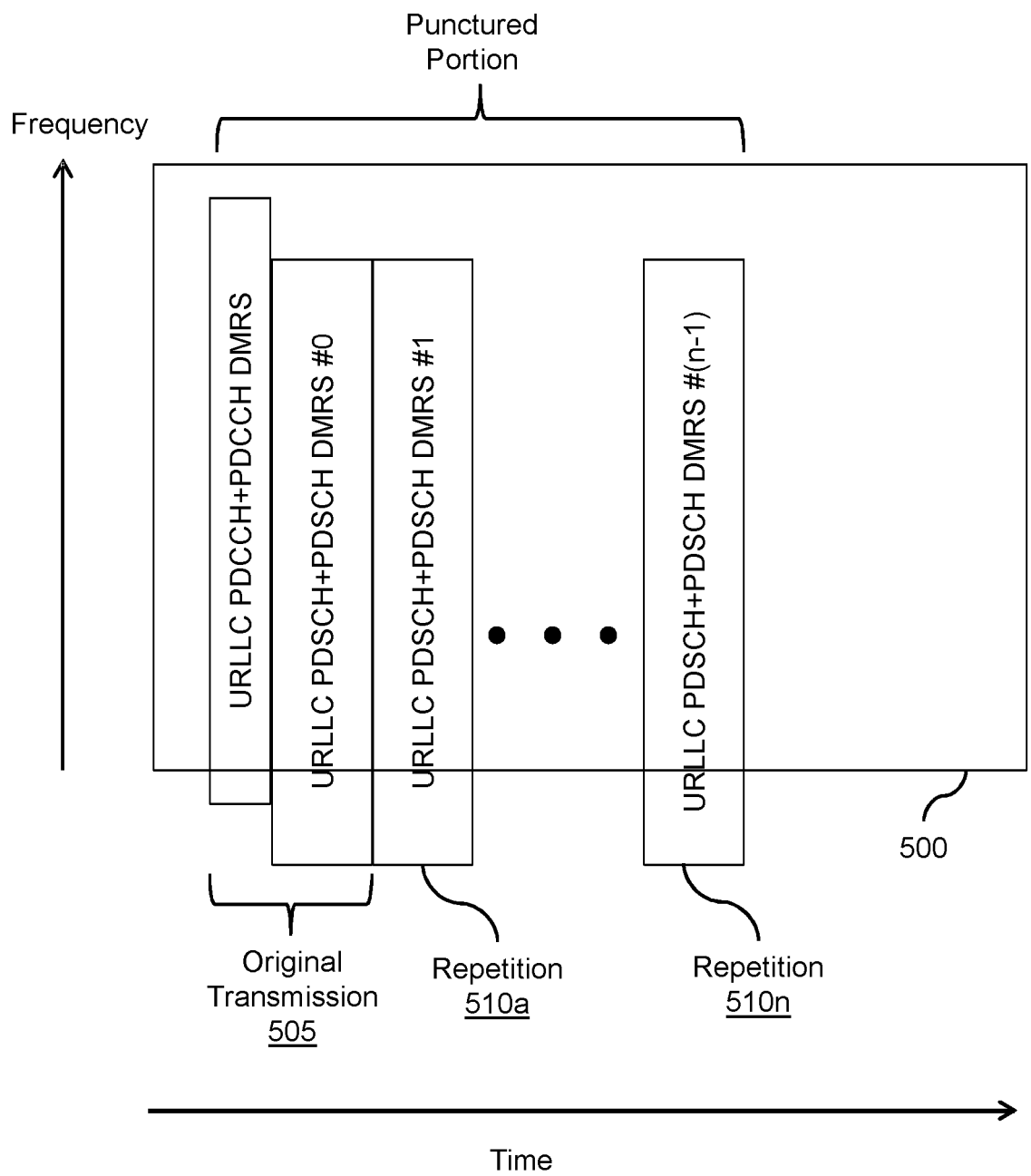
FIG. 5 is a block diagram of a punctured transmission with a single control data transmission and repeated user data transmissions without frequency hopping in accordance with exemplary embodiments of the present disclosure.

The transmission in FIG. 5 is a single TTI 500 for the second service, which does not have strict latency requirements, punctured by data for the first service, which has strict latency requirements. In this example the original transmission 505 includes both control data, which in this example is URLLC PDCCH+PDCCH DMRS, and user data, which in this example is URLLC PDSCH+PDSCH DMRS. In contrast to the example of FIG. 4, in the example of FIG. 5 the control data is not retransmitted and only the user data is retransmitted 510a-510n. Further, the original transmission and repetitions are directly adjacent to each other in time and in the frequency the original transmission and repetitions do not occupy all of the frequency resources at a particular time within the TTI 500 and extends outside of the frequency resources used for the TTI 500.

Figure 6:
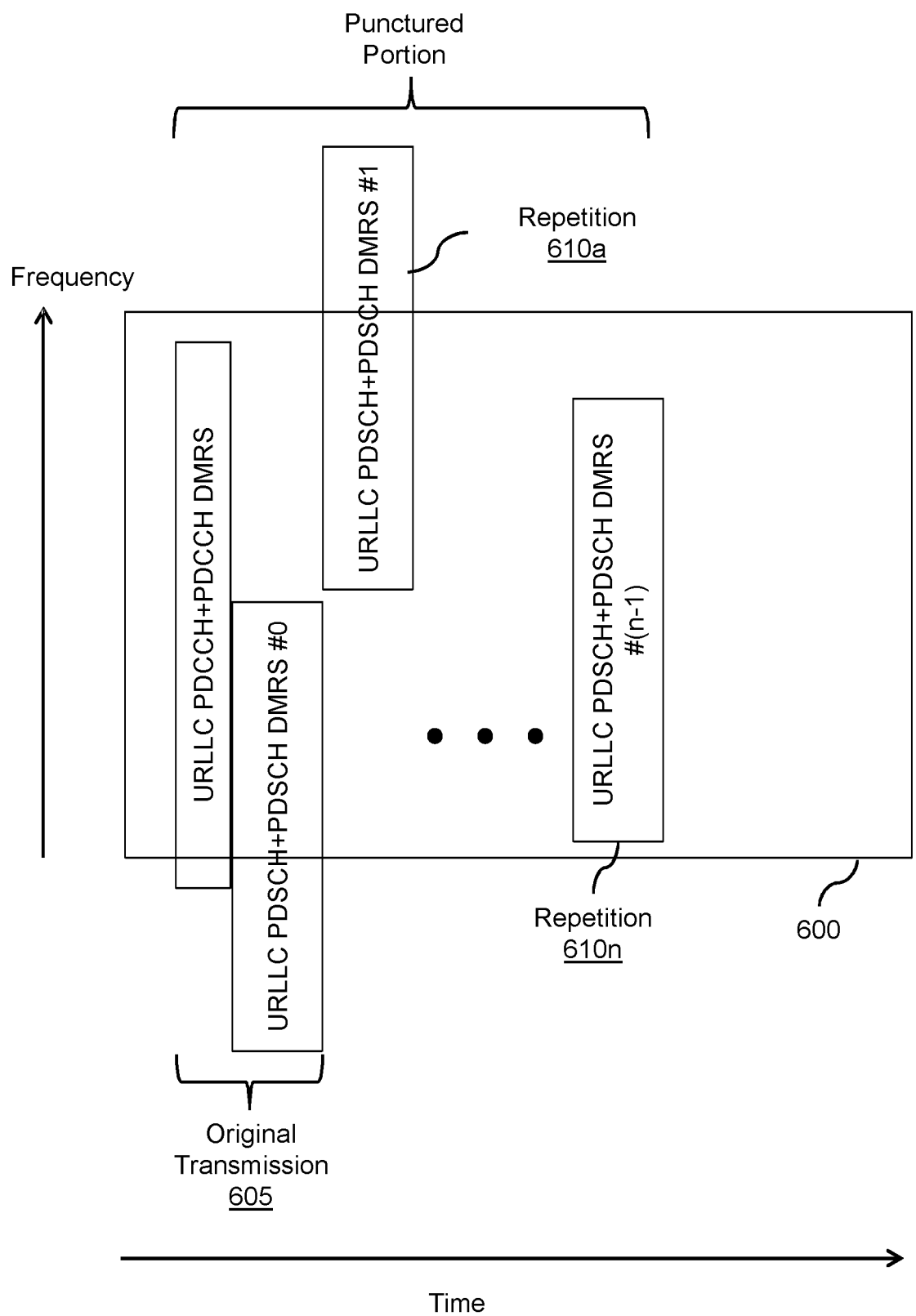
FIG. 6 is a block diagram of a punctured transmission with a single control data transmission and repeated user data transmissions with frequency hopping in accordance with exemplary embodiments of the present disclosure.

The example in FIG. 5 does not employ frequency hopping for the transmission for the first service. In contrast, the example in FIG. 6 employs frequency hopping for the first service. Otherwise, the example of FIG. 6 is the same as that of FIG. 5, i.e., the original control data is not retransmitted but the user data is and the original transmission and repetitions are directly adjacent to each other so that there is only a single punctured portion. Thus, in FIG. 6 the TTI 600 for the second service includes a single punctured portion having the original transmission 605 and one or more repetitions 610a-610n. Activating or deactivating frequency hopping can be configured by a higher layer parameter or carried by a field in the Downlink Control Information (DCI), which is carried by the PDCCH of the first service.

Figure 7:
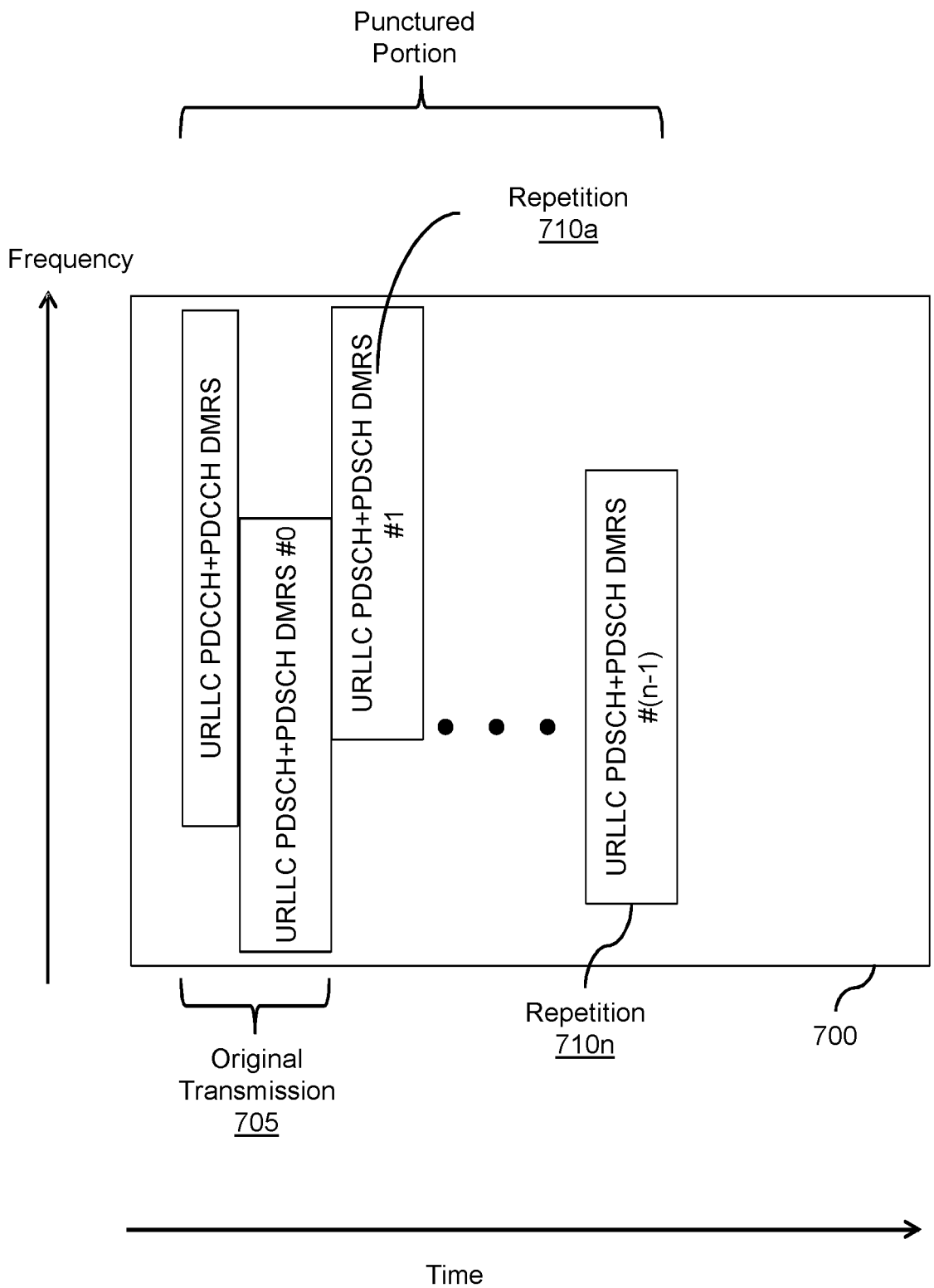
FIG. 7 is a block diagram of another punctured transmission with a single control data transmission and repeated user data transmissions with frequency hopping in accordance with exemplary embodiments of the present disclosure.

The transmission in FIG. 7, like the example in FIG. 6, employs frequency hopping, and like the examples in both FIGS. 5 and 6 the original control data is not retransmitted but the user data is retransmitted and the original transmission and repetitions are directly adjacent to each other so that there is only a single punctured portion. However, in this example the original transmission 705 and the one or more repetitions 710a-710n are contained within the frequency resources allocated to the TTI 700.

Although FIGS. 4-7 illustrate the usage of particular time-frequency resources for the punctured data, other time-frequency resources can be used. In the example of FIG. 4, the redundant transmissions can all be directly adjacent to one another in time and directly adjacent to the originally transmitted data instead of interleaving data for the second service between the redundant transmissions. In the examples of FIGS. 5-7 the original and redundant transmission for the low latency service can be interleaved in time with transmissions for the second service similar to the illustration in FIG. 4.

Furthermore, the number of redundant transmissions can deviate from the illustrated examples and the present disclosure can be implemented using a fewer or greater number of redundant transmissions. Finally, the particular amount of time resources and/or frequency resources used for the original transmission and the repetitions for the low latency service can be greater or less than what is illustrated in FIGS. 4-7.

Figure 1:
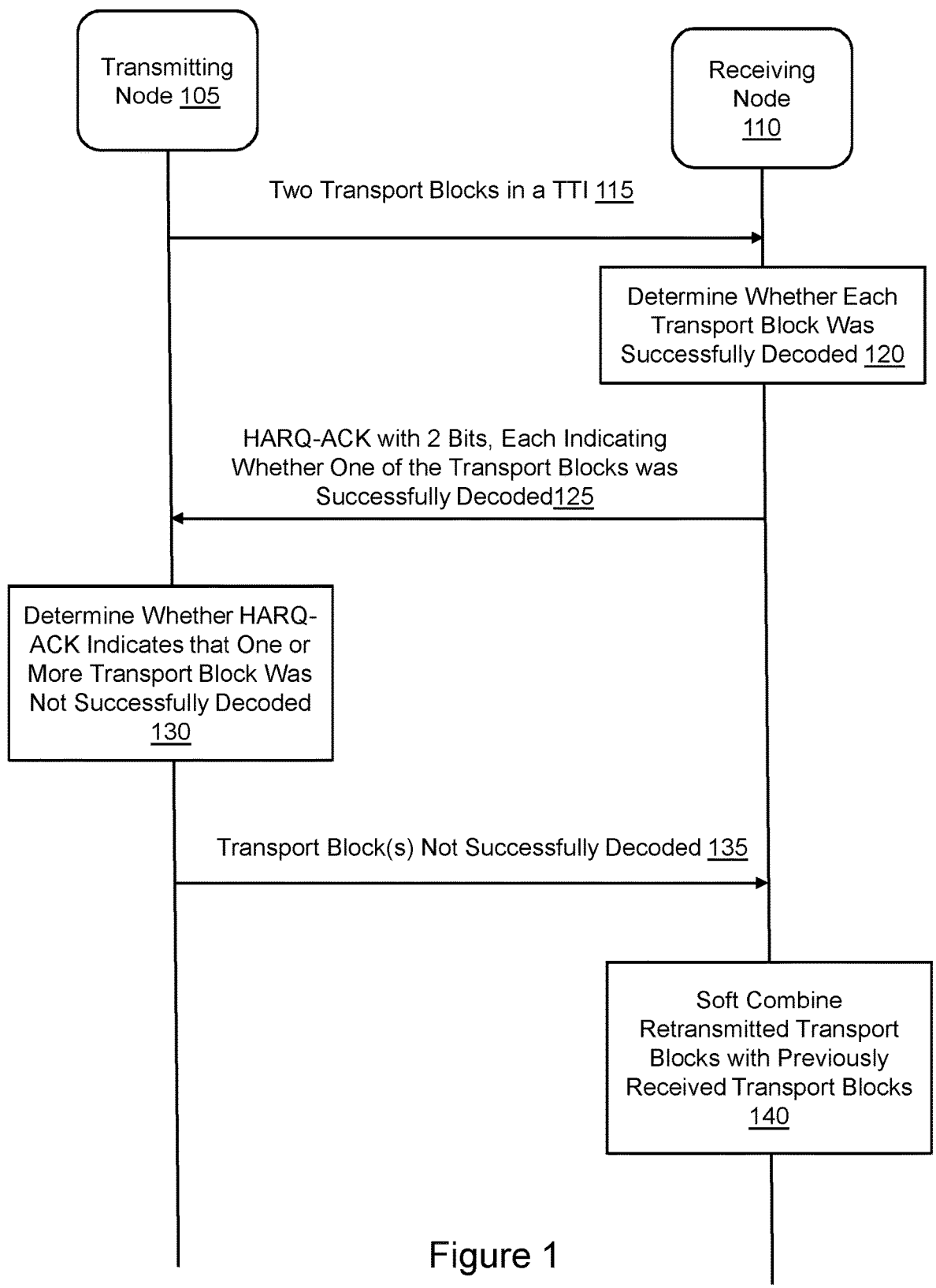
FIG. 1 is a signaling diagram of a conventional HARQ process.
Figure 2:
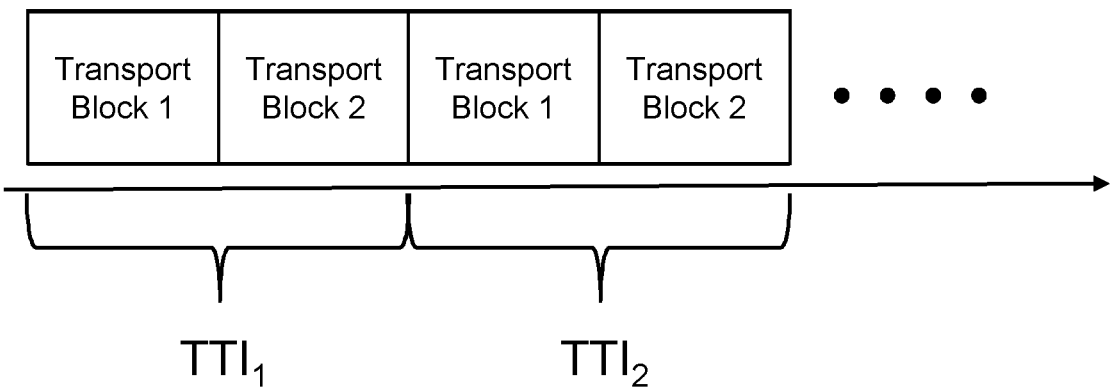
FIG. 2 is a block diagram of conventional transport block transmissions.
Figure 8:
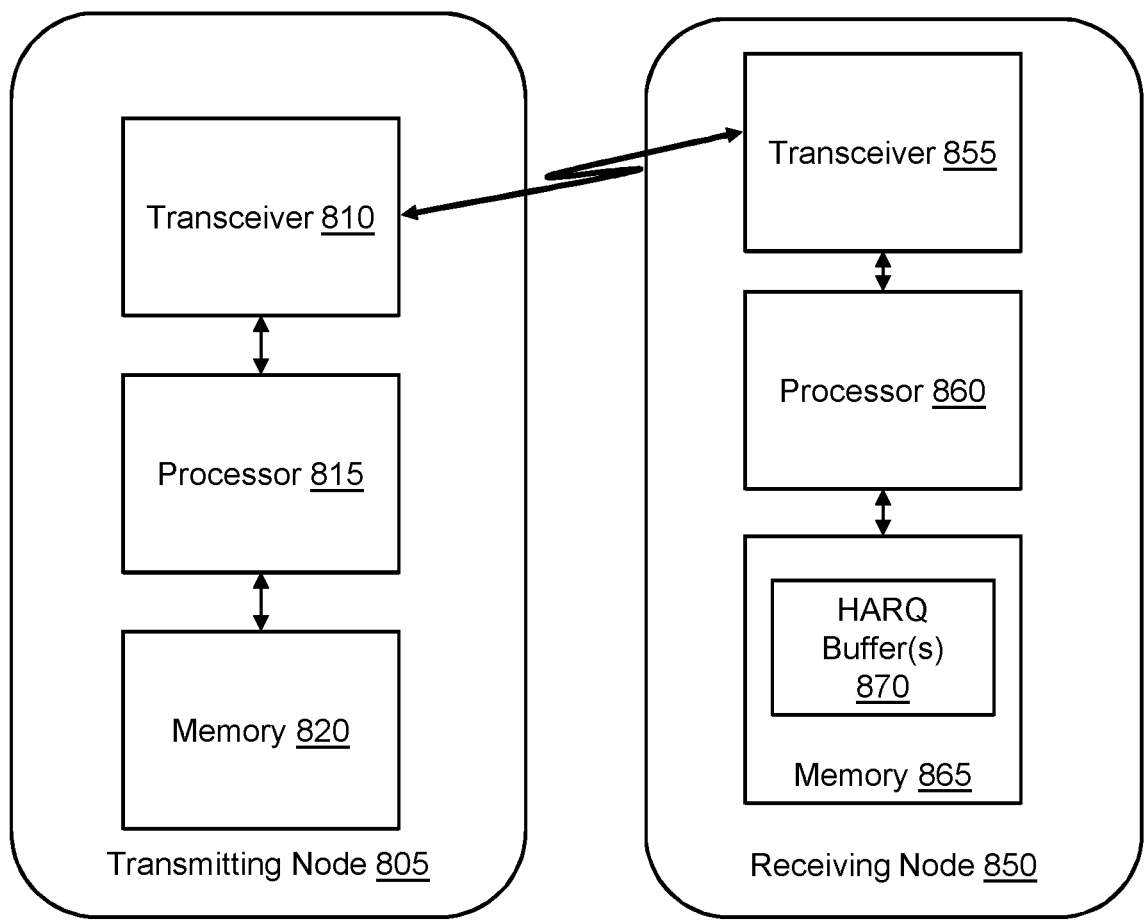
FIG. 8 is a block diagram of a transmitter and receiver in accordance with exemplary embodiments of the present disclosure.

Prior to describing the details of the methods performed by a transmitting and receiving node to support the puncturing illustrated in FIGS. 4-7, a high-level description of an exemplary transmitting node and receiving node will be presented in connection with FIG. 8 to assist the reader in understanding the details of the implementation of the processes of the present disclosure that follows. As illustrated, a transmitting node 805 can transmit information to receiving node 850, and the receiving node 850 can transmit information to transmitting node 805. In order to accomplish this, the transmitting node 805 includes a processor 815 coupled to a transceiver 810 and memory 820; and the receiving node 850 includes a processor 860 coupled to a transceiver 855 and memory 865. Transceivers 810 and 855 respectively provide the transmitting node 805 and receiving node 850 with a wireless interface. Processors 815 and 860 can be any type of processor, such as a microprocessor, application specific integrated circuit (ASIC), field programmable gate array (FPGA), and/or the like.

Memory 865 includes a HARQ buffer 870, which is used to store different transmissions for soft combining. Memory 820 and 865 can be any type of memory and can include both transitory and non-transitory memory. The non-transitory memory can include code, which when executed by the associated processor, causes the processor to perform the methods described herein. The non-transitory memory can include a computer-readable medium storing the code. Although FIG. 8 illustrates the use of transceivers, separate transmitters and receivers can be provided, depending upon implementation. FIG. 8 is a high-level illustration of a transmitting node 805 and a receiving node 850 and those skilled in the art will recognize that each can include additional components, such as input devices, interfaces to other devices, one or more antennas, one or more displays, etc.

Although the discussion below assumes the transmitting node 805 is a base station (e.g., an eNB, a gNB, or any other type of base station) and the receiving node 850 is a UE (user equipment), the disclosure can also be employed where the transmitting node 805 is a UE and the receiving node 850 is a base station. In this case the transmission of the data for the first and second services involves transmissions from at least two UEs, i.e., one of the UEs transmits data for the first service and another UE or a plurality of other UEs transmit data for the second service during the TTI. The transmission by the one UE of data for the first service can be coordinated with the transmissions by the other UEs for the second service so that there is no, or minimal, overlap in time and/or frequency. Uncoordinated transmission can also be employed so that the transmission by the one UE of data for the first service overlaps in time and/or frequency with transmission by at least one of the other UEs.

Figure 9:
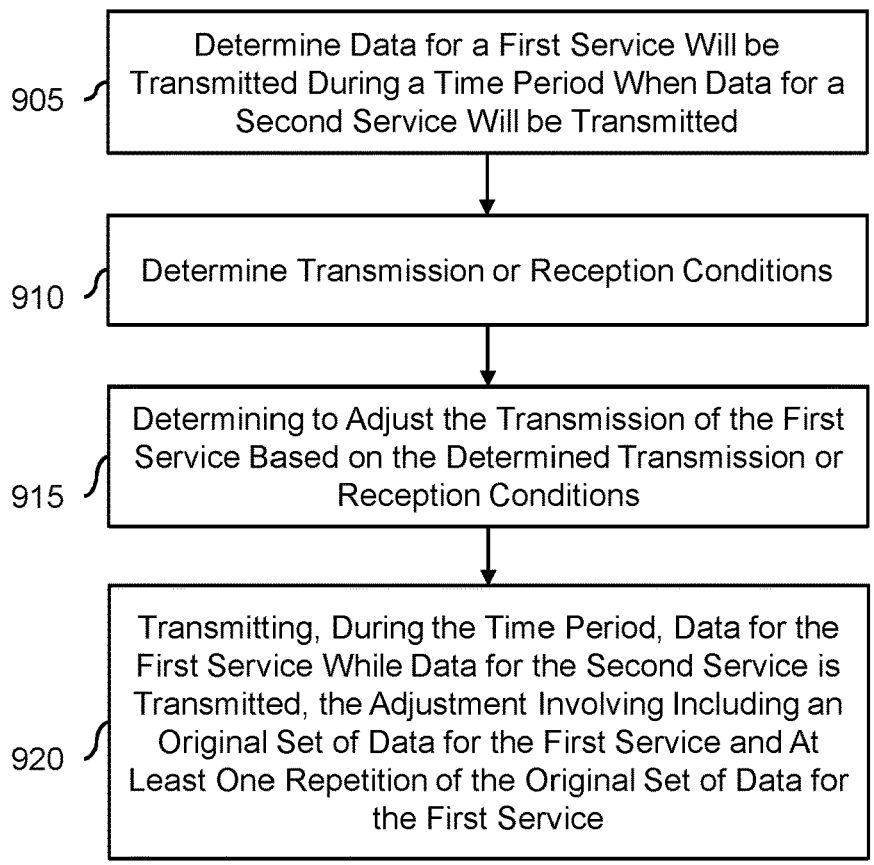
FIG. 9 is a high-level flow diagram of an exemplary transmission method in accordance with exemplary embodiments of the present disclosure.
Figure 10:
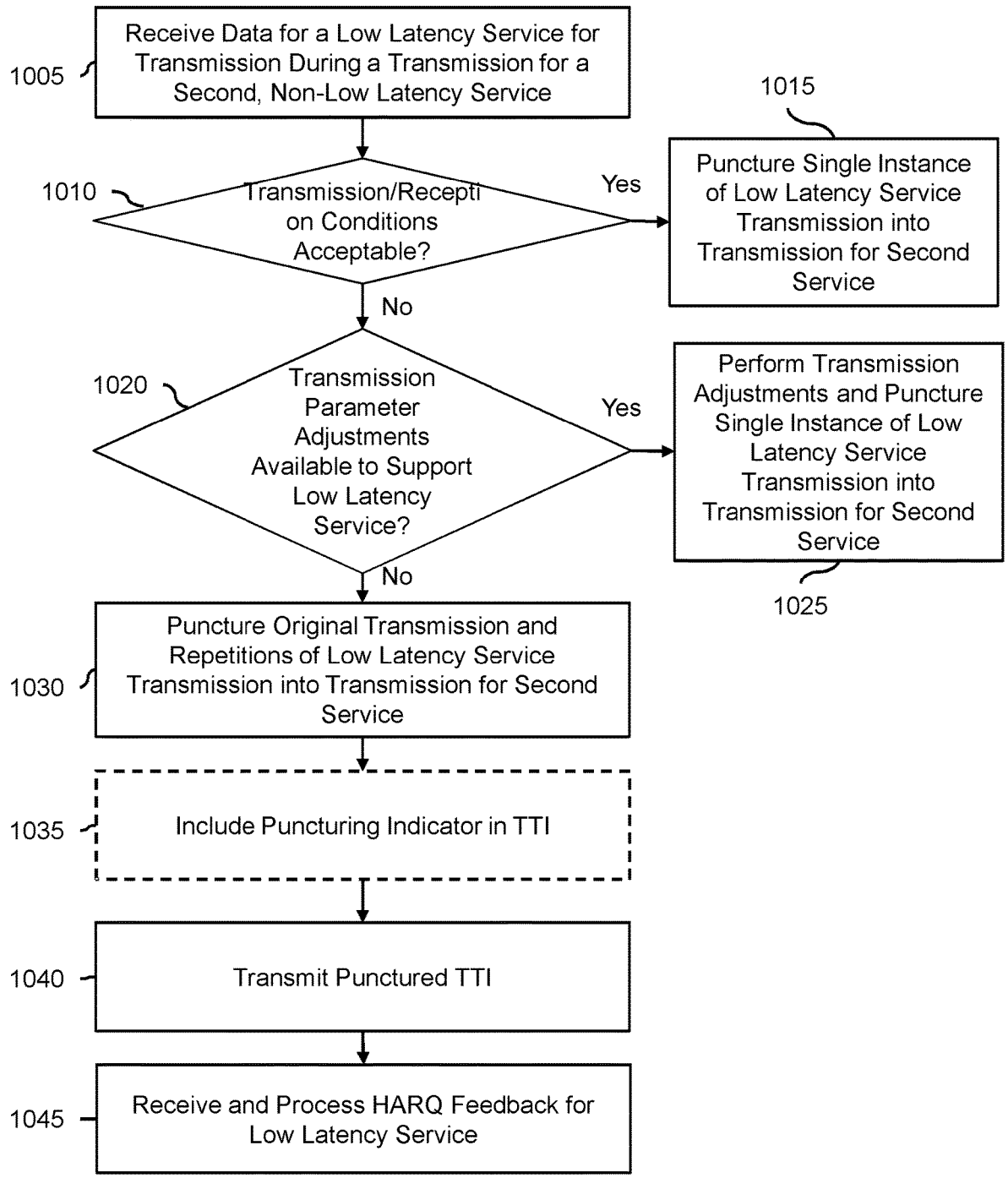
FIG. 10 is a flow diagram of an exemplary transmission method in accordance with exemplary embodiments of the present disclosure.

A method performed by a transmitting node 805 will first be presented in connection with the high-level flow chart of FIG. 9, and then the details will be addressed in connection with the description of FIG. 10. Initially the transmitting node 805 determines that data for a first service will be transmitted during a time period when data for a second service will be transmitted, where data for the first service requires lower latency than data for the second service (step 905). The transmitting node 805 then determines transmission or reception conditions (step 910) and based on the determined transmission or reception conditions determines to adjust the transmission of the first service (step 915). As discussed in detail below, these adjustments can be adjusting transmission power, modulation, and/or coding, as well as employing puncture bundling. For purposes of explanation only, it will be assumed in this example that the transmission adjustment includes at least the use of puncture bundling. Accordingly, the transmitting node 805 transmits, during the time period, data for the first service while data for the second service is transmitted, and the adjustment involves including an original set of data for the first service and at least one repetition of the original set of data for the first service (step 920).

Turning now to the flowchart of FIG. 10, the processor 815 of the transmitting node 805 initially, via the transceiver 810, receives data for a low latency service for transmission during a time period for transmission of data for a second, non-low latency service (step 1005). The processor 815 of transmitting node 805 then determines whether the transmission and/or reception conditions are acceptable (step 1010). This determination can be based on any number of factors, including Signal-to-Noise Ratio (SNR), Signal-to-Interference Ratio (SIR), Block Error Rate (BLER), etc. Further, information used for making this determination can be obtained using conventional feedback techniques for reporting transmission/reception conditions to the transmitting node.

If processor 815 determines the conditions are acceptable ("Yes" path out of decision step 1010), then processor punctures the second transmission with a single instance of the data for the low latency service and transmits the data for both the first and second services using transceiver 810 (step 1015). This puncturing can take a form similar to what is illustrated in FIGS. 3A and 3B (depending upon whether the transmitting node is a base station or UE). The puncturing does not have to occupy the same time and/or frequency resources illustrated in FIGS. 3A and 3B and the data for the first service punctured into the data for the second service in different time and/or frequency locations than what is illustrated in FIGS. 3A and 3B. The significance of this transmission is that it does not include any redundancy for the data of the first service in the transmission. Further, as discussed above, if the transmitting node is a base station then there will be minimal or no overlap between the data being transmitted for the first and second services, whereas if the transmitting node is a UE there may be overlap in time and/or frequency.

If the processor 815 of transmitting node 805 determines the transmission and/or reception conditions are not acceptable ("No" path out of decision step 1010), then processor 815 determines whether transmission adjustments are available to support the low latency service (step 1020). Transmission adjustments can include increasing transmission power, changing modulation and/or coding, etc. If there are transmission parameter adjustments available ("Yes" path out of decision step 1020) then the transmitting node transmits the data for the low latency service punctured in the transmission of the data for the second service using the adjusted transmission parameters via transceiver 810 (step 1025).

Situations can occur where the transmitting node 805 is already transmitting at maximum power or has already employed the most robust modulation and/or coding, and thus transmission adjustments would not be available. These situations can occur, for example, when the UE is at the edge of the base station's cell, when coverage is spotty due to the use of high frequencies, and when there is unwanted interference. In these and other similar situations no transmission adjustments are available but due to the strict latency requirements of the first service it is still necessary for the transmitting node to attempt to provide this data to the receiving node 850, which in the present disclosure is achieved by transmitting the original data for the first service and one or more redundant versions of the original data for the first service in a single transmission, e.g., a single TTI of the second service.

If transmission parameter adjustments are not available to support the low latency service ("No" path out of decision step 1020), then processor 815 decides to transmit the data for the first service using puncture bundling. Specifically, the processor 815 punctures the original transmission and one or more repetitions of the original transmission for the first service into a transmission for the second service (step 1030). This can be achieved using any of the examples discussed above in connection with FIGS. 4-7, as well as variations thereof. Thus, depending upon implementation, the one or more repetitions may contain both the control data and user data or can contain only the user data.

According to exemplary embodiments, the transmitting node 805 can explicitly signal the presence of the puncture bundling in the TTI, the receiving node 850 can perform blind detection, and/or the receiving node 850 can be preconfigured using separate signaling to facilitate blind detection.

The explicit indicator can be implemented in a variety of different ways. The explicit indicator can be a Puncturing Bundle Indicator (PBI) that is included in the transmission of the original data for the first service but not in the repetitions for the first service. This allows the receiving node to distinguish between the transmission of the original data for the first service from the repetitions so that the receiving node can perform soft combining using the transmission of the original data and one or more of the repetitions. Alternatively, the PBI can be sent from a control channel, which can be carried in a mini-slot. The PBI can also carry information on the next punctured resource blocks, such as time/OFDM symbol/slot offset, PRB—(Physical Resource Block) offset, or sequences of such information for each puncture bundle transmission to assist the receiving node to find the received transmissions for the first service.

The explicit indicator can also include information about the size of the punctured data for the first service, i.e., the size of the data for the original transmission for the first service and all of the repetitions within a TTI for the second service. This size information, referred to herein as PUNCTURE_BUNDLE_SIZE, can be calculated based on the transport block (TB) size of the transmission for the second service, the URLLC transport block size, channel conditions, etc. The PUNCTURE_BUNDLE_SIZE can be equal to the amount of the original transmission for the first service and the repetitions, which in the example of FIG. 4 would be 4. Thus, the original transmission of the data for the first service and the repetitions resulting from a single Radio Link Control (RLC) Service Data Unit (SDU) are transmitted consecutively in the same TTI for the second service and has a HARQ process number 0.

The explicit indicator can further comprise information informing the receiving node 850 of how the data for the first service was punctured into the TTI of the second service, coding schemes of the transmission of the original data for the first service and the repetitions, and size information similar to the PUNCTURE_BUNDLE_SIZE information. This information, referred to herein as a punctureBundlingField. In one embodiment this information can be included in both the original transmission of the data for the first service and the repetitions to handle problems with misdetection of the puncture indicator, such as when the original transmission of the data for the first service and/or one or more of the repetitions were not received by the receiving node 850, and thus the receiving node 850 cannot rely upon the amount of the original transmission and repetitions. Thus, for example, if receiving node 850 did not receive the original transmission of the data for the first service and the first repetition but has detected the second repetition, the receiving node 850 can decode the second repetition and any further repetition (in which case soft combining can be performed). Further, the receiving node 850 can examine portions of the transmission received earlier to try to decode the original transmission of data for the first service and the first repetition.

The PBI can be used by itself, in combination with the PUNCTURE_BUNDLE_SIZE, in combination with the PUNCTURE_BUNDLE_SIZE and the punctureBundlingField, as well as in combination with any information related to puncturing, punctured areas, and/or coding schemes.

In addition or as an alternative to providing an explicit indicator, the transmitting node 805 can configure the receiving node 850, for example via Radio Resource Control (RRC) message, a MAC (Medium Access Control) CE (Control Element), or other similar messaging, to preconfigure the semi-static regulation of the next transmitted resources, such as the resources using the same PRB and the earliest possible OFDM symbols, etc. Alternatively or additionally, this messaging can initially preconfigure the frequency hopping pattern and the PBI can correspond to a frequency hopping pattern index or can revoke the frequency hopping.

Blind detection of the puncture bundling can be implemented in a way to increase the ability of the receiving node 850 to recognize the puncture bundling. For example, the transmission of the original data for the first service and each of the repetition can employ the same redundancy version, i.e., each are coded in the same manner, within a predefined time window. Thus, the processor 860 of receiving node 850 can detect the puncture bundling by the sequence of QAM symbols of the original transmission for the first data service and the repetitions having the same signal values after channel equalization. Thus, the punctured area includes a repetitive pattern so the processor 860 of the receiving node 850 can perform correlation based on signal processing to estimate the presence of a puncture bundled transmission in terms of transport block lengths and bundling number within a predefined time window, such as a sub-frame slot of the second service. Another advantage to using the same redundancy versions for the transmission of the original data for the first service and the one or more repetitions is that the signal can be combined at the QAM symbol level, which reduces receiving complexity while also achieving the bundling gain.

The assisted blind detection can provide the receiving node 850 with reconfiguration information to specify parts or almost all of the bundling parameters that can be used. The reconfiguration information is sent separately from the transmission of the data for the first service, such as in a Radio Resource Control (RRC) message or other L1/L2 (layer 1/layer 2) signaling message. Notification of the potential presence of puncture bundling can be achieved by transmitting a semi-persistent change instruction to receiving nodes 850 that are using the first service.

Returning to FIG. 10, if an explicit indicator is employed then it is included in the punctured TTI in the manner described above (step 1035). If an explicit indicator is not supported this step is omitted. Processor 815 of transmitting node 805 then transmits the punctured TTI using transceiver 810 to receiving node 850 (step 1040). The transmission of the punctured TTI will vary depending upon whether the transmitting node 805 is a base station or a UE. When the transmitting node 805 is the base station, the transmission of the TTI can include data for both the first and second services. Although the same could occur when the transmitting node 805 is a UE, the more likely scenario is the UE transmits only the data for the first service and one or more other UEs transmit the data for the second service, all of which occur during a TTI of the second service.

At some point after the receiving node 850 receives and attempts to decode the TTI the receiving node 850 will transmit HARQ feedback, i.e., an ACK or NACK, for the first service (step 1045) to the transmitting node 805. According to exemplary embodiments the HARQ feedback is a single message for the puncture bundle, i.e., the transmission of the original data for the first service and all repetitions within the puncture bundle. In contrast, conventional HARQ techniques involve separate HARQ feedback for the originally transmitted data and each repetition. Thus, the puncture bundling of the present disclosure not only helps achieve the strict latency requirements of the first service but also reduces overhead signaling by eliminating at least one, and possibly more depending upon the number of repetitions in a puncture bundle, HARQ feedback transmission. The reduced signaling increases air interface efficiency by reducing the number of radio resources consumed to support HARQ, as well as reduces interference that may be caused by the additional HARQ feedback transmissions.

Figure 11:
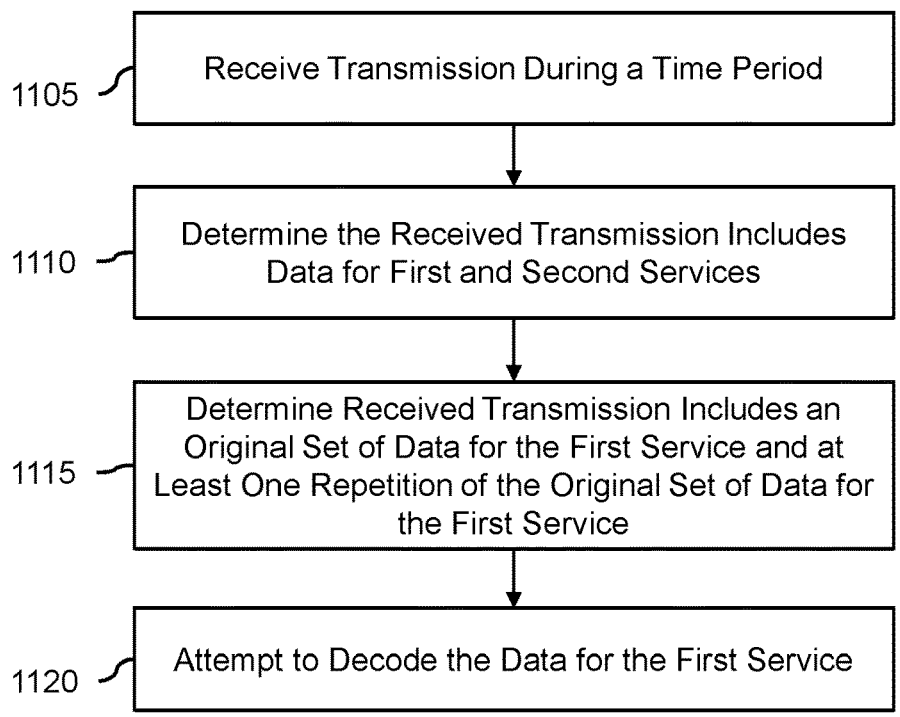
FIG. 11 is a high-level flow diagram of an exemplary reception method in accordance with exemplary embodiments of the present disclosure.
Figure 12:
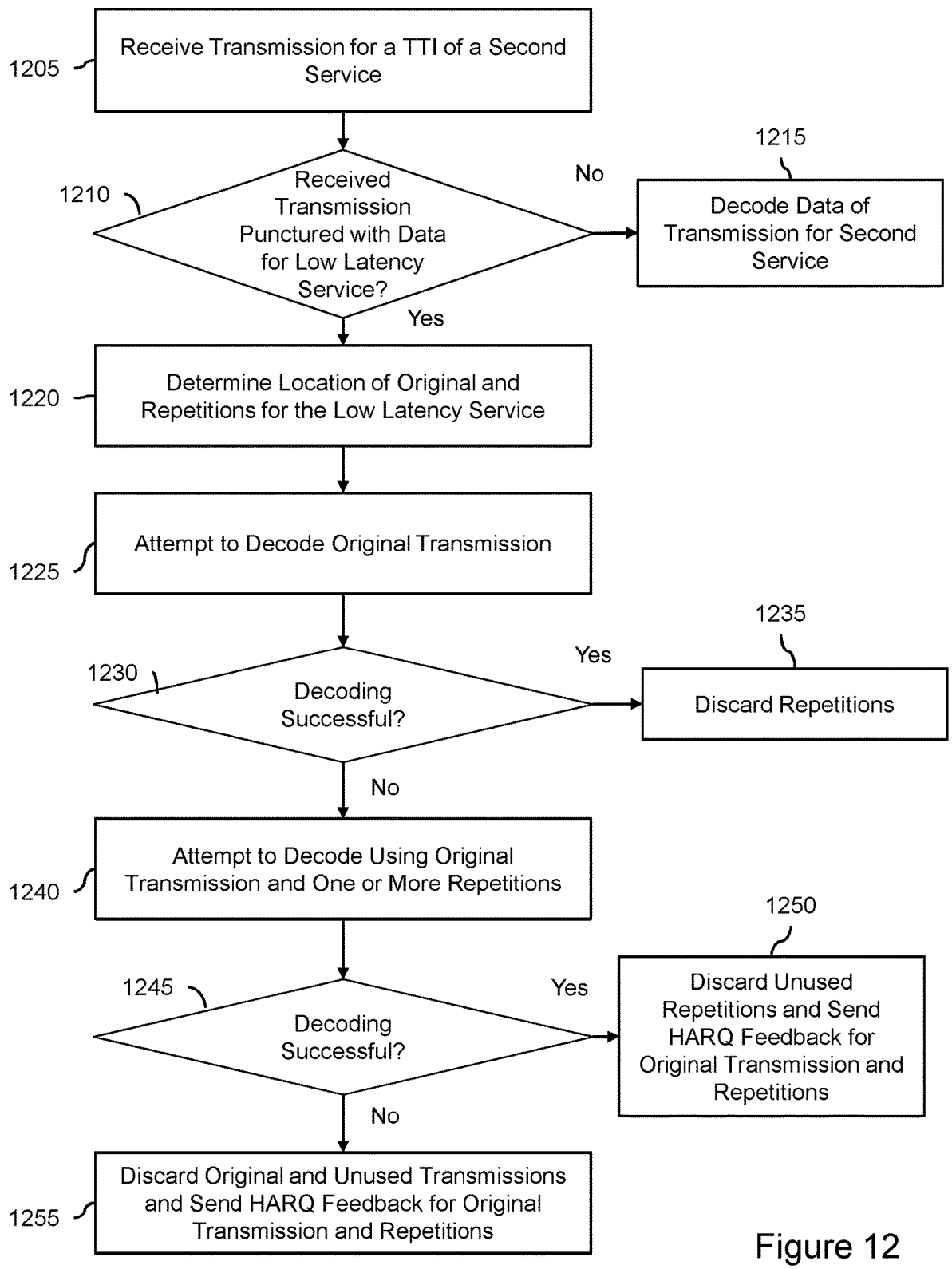
FIG. 12 is a flow diagram of an exemplary reception method in accordance with exemplary embodiments of the present disclosure.

A method performed by a receiving node 850 will first be presented in connection with the high-level flow chart of FIG. 11, and then the details will be addressed in connection with the description of FIG. 12. Initially the receiving node 850 receives a transmission during a time period (step 1105) and determines the received transmission includes data for the first and second services (step 1110). The receiving node 850 then determines the received transmission includes an original set of data for the first service and at least one repetition of the original set of data for the first service (step 1115) and the receiving node attempts to decode the data for the first service using the original set of data alone or in combination with one or more repetition of the at least one repetition of the original set of data for the first service (step 1120).

Turning now to FIG. 12, the processor 860 of receiving node 850 initially receives, via transceiver 855, a transmission of a TTI for the second service (step 1205). The processor 850 then determines whether the received transmission was punctured with data for the first service (step 1210). This determination can be performed in a number of different ways. For example, a CRC (Cyclic Redundancy Check) bitmap can be used to indicate code blocks transmitted after the punctured part, such that in one example a CRC=00000 is used for code blocks preceding a punctured code block and a CRC=01000 can be used to indicate code blocks following a punctured code block. In another example the transmitting node 850 can provide a puncture bundling assignment to the receiving node 850, such as assigning the transmission for the first service using the DCI with a CRC bitmap matching the RNTI (Radio Network Temporary Identity) of the intended receiving node 850 for the scheduled URLLC transmission. The transmitting node 850 could also include a puncture bundling indicator in the TTI, which indicates that at least a portion of the time-frequency resources for the second transmission is punctured. For example, the receiving node 850 can be configured via an RRC message to detect puncturing if a specific reference signal is detected, for example an URLLC PDCCH DMRS. In yet another example the receiving node 850 can blindly detect the presence of punctured data, such as by comparing two separate transmissions of the second service in order to generate a hypothesis of which of the separate transmissions were punctured.

If the processor 860 determines there is no puncturing of the TTI for the second service ("No" path out of decision step 1210), then processor 860 attempts to decode the data of the transmission for the second service (step 1215). If the processor 860 determines there is puncturing ("Yes" path out of decision step 1215), then processor 860 determines the location of the transmission of the original data for the first service and the repetitions (step 1220). The manner in which the receiving node 850 determines the location of the data for the first service depends upon whether the network implements an explicit indicator, blind detection, or assisted blind detection, each of which can be implemented in the manner described above.

The processor 860 of receiving node 850 then attempts to decode the original transmission of the data for the first service (step 1225). If the decoding was successful ("Yes" path out of decision step 1230), then the processor 860 discards the repetitions because they were not needed to decode the data for the first service (step 1235). Whether or not decoding is successful can be based on conventional techniques, such as by checking the CRC (Cyclic Redundancy Check).

If the decoding was not successful ("No" path out of decision step 1230), then the processor 860 attempts to decode using the transmission of the original data for the first service and one or more of the repetitions (step 1240). This can be an iterative process where the processor 860 first attempts to decode using the original data and a first repetition and if this is not successful the processor 860 attempts to decode using the original data and the first and second repetitions, etc. If the processor 860 successful decodes the data for the first service ("Yes" path out of decision step 1245), then the processor 860 discards any unused repetitions and sends a single HARQ feedback for the original transmission and the repetitions indicating successful decoding (step 1250). If the processor 860 did not successfully decode the data for the first service using the original transmission and all of the repetitions ("No" path out of decision step 1245), then the processor 860 discards the original transmission and repetitions and sends a single HARQ feedback for the original transmission and the repetitions indicating a decoding failure (step 1255). Depending upon implementation, the transmitting node 805 can attempt to retransmit the data for the first service, either as only the original data or along with one or more repetitions, assuming the retransmission can satisfy the strict latency requirements of the first service.

Exemplary embodiments have been described in connection with the transmission of downlink data; however the present disclosure is equally applicable to uplink transmissions, in which case the punctured data for the first service would be PUSCH instead of the PDCCH sent in the downlink, as illustrated above in connection with FIG. 3A.

Although exemplary embodiments have been described with the data for the first service puncturing data for the second service, the bundle puncturing of the present disclosure can also be employed where there is no puncturing. Further, although exemplary embodiments have been described in which URLLC is the first service and MBB is the second service, the present disclosure is equally applicable to the transmission of any type of low latency service and puncturing any other type of service that does not have the same low latency requirements, such as massive Machine-Type Communication (mMTC), Multimedia Broadcast Multicast Services (MBMS), etc.

Although exemplary embodiments have been described with the time period for the transmission of the second service being a TTI, it should be recognized that a TTI may correspond to a subframe, a slot, or a mini-slot, and thus the terms subframe, slot, or mini-slot can be substituted for TTI in the discussion above.

Thus, the embodiments disclosed herein provide radio communication systems, devices and methods for enabling decoding of data for a first service having strict low latency requirements by including repetitions in the transmission punctured with the originally transmitted data. It should be understood that this description is not intended to limit the disclosure. On the contrary, the exemplary embodiments are intended to cover alternatives, modifications and equivalents, which are included in the spirit and scope of the disclosure. Further, in the detailed description of the exemplary embodiments, numerous specific details are set forth in order to provide a comprehensive understanding of the disclosure. However, one skilled in the art would understand that various embodiments might be practiced without such specific details.

Any appropriate steps, methods, or functions may be performed through a computer program product that may, for example, be executed by the components and equipment illustrated in one or more of the figures above. For example, memories 820 and 865 may comprise computer readable means on which computer programs can be stored. The computer program may include instructions which cause the processor 815 and 860, respectively (and any operatively coupled entities and devices, such as transceivers 810 and memory 820 and transceivers 855 and memory 865) to execute methods according to embodiments described herein. The computer programs and/or computer program products may thus provide means for performing any steps herein disclosed.

Any appropriate steps, methods, or functions may be performed through one or more functional modules or circuits. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 815 and/or 860, possibly in cooperation with memory 820 and/or 865. Processors 815 and/or 860 and memory 820 and/or 865 may thus be arranged to allow processors 815 and/or 860 to fetch instructions from memories 820 and/or 865 and execute the fetched instructions to allow the respective functional module to perform any steps or functions disclosed herein.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The scope of the subject matter is defined by the claims, and may include other examples that occur to those skilled in the art. Such other examples are intended to be within the scope of the claims.

The invention claimed is:

1. A method implemented in a transmitting node, the method comprising:
   determining data for a first service will be transmitted during a time period when data for a second service will be transmitted, wherein the data for the first service requires lower latency than the data for the second service;
   determining transmission or reception conditions;
   determining, based on the determined transmission or reception conditions, to adjust the transmission of the first service;
   transmitting the data for the first service and the data for the second service in the same time period, wherein the adjustment of the transmission of the first service involves including an original set of data for the first service and at least one repetition of the original set of data for the first service; and
   receiving feedback from a receiving node regarding whether or not the receiving node successfully decoded the data for the first service, wherein the feedback is included in a single transmission and relates to both the original set of data and the at least one repetition.

2. The method of claim 1, wherein the transmitting node is a base station and the transmission of the data for the first and second services are interlaced in time or frequency so that the data for the first and second services does not overlap in time or frequency.

3. The method of claim 1, wherein the transmitting node is a first user equipment and a second user equipment transmits the data for the second service overlapping in time or frequency with the transmission by the first user equipment of the data for the first service.

4. The method of claim 1, wherein the adjustment of the transmission for the first service involves adjusting a transmission power or coding used for the transmission of the data for the first service.

5. The method of claim 1, wherein the original set of data for the first service and the at least one repetition of the original set of data for the first service are the same.

6. The method of claim 1, wherein the original set of data for the first service and the at least one repetition of the original set of data for the first service are coded differently.

7. The method of claim 1, wherein the original set of data for the first service and the at least one repetition of the original set of data for the first service are transmitted directly adjacent to each other in time within the time period.

8. The method of claim 1, wherein the original set of data for the first service and the at least one repetition of the original set of data for the first service are separated in time within the time period so that data for the second service is transmitted in time between the original set of data for the first service and the at least one repetition of the original set of data for the first service.

9. The method of claim 1, further comprising including an explicit indicator of presence of the at least one repetition of the original set of data for the first service in the transmission during the time period.

10. The method of claim 9, wherein the explicit indicator includes information regarding a size of the original set of data and the at least one repetition.

11. The method of claim 9, wherein the explicit indicator includes information on how the original set of data and the at least one repetition are transmitted during the time period and at least a coding scheme employed to code the original set of data and the at least one repetition.

12. The method of claim 9, wherein the explicit indicator is only included in the original set of data.

13. The method of claim 9, wherein the explicit indicator is included in the original set of data and the at least one repetition.

14. The method of claim 1, further comprising providing a receiving node with reconfiguration information via a transmission separate from the transmission of the data for the first and second services during the period of time.

15. The method of claim 1, wherein the original set of data for the first service includes a control portion and a user data portion and the at least one repetition of the original set of data for the first service repeats the user data portion but not the control portion of the original set of data for the first service.

16. The method of claim 1, wherein the first service is an Ultra-Reliable Low Latency Communication (URLLC) service and the second service is a Mobile Broadband (MBB) or enhanced MBB service.

17. The method of claim 1, wherein the original set of data for the first service and the at least one repetition are transmitted using frequency hopping so that the original set of data and the at least one repetition are transmitted using different sets of frequencies.

18. The method of claim 1, wherein the time period is a transmission time interval (TTI), slot, or mini-slot of the second service.

19. A computer program comprising computer-readable instructions for causing at least one programmable processor to perform the method of claim 1, wherein the computer program is stored on a non-transitory computer-readable medium.

20. The method of claim 1, wherein the determining, based on the determined transmission or reception conditions, to adjust the transmission of the first service is performed automatically by the transmitting node which activates puncture bundling so that the data for the first service is punctured into the data of the second service, and the original data for the first service and the at least one repetition of the original set of data for the first service are bundled and transmitted in the same time period when data for the second service is transmitted.

21. The method of claim 1, wherein the single transmission is a HARQ (Hybrid Automatic Repeat Request) transmission.

22. A method implemented in a receiving node, the method comprising:
   receiving a transmission during a time period;
   determining the transmission includes data for a first service and data for a second service, wherein the data for the first service requires lower latency than the data for the second service;
   determining the transmission includes an original set of data for the first service and at least one repetition of the original set of data for the first service;
   attempting to decode the data for the first service; and
   transmitting feedback to a transmitting node regarding whether or not the receiving node successfully decoded the data for the first service, wherein the feedback is included in a single transmission and relates to both the original set of data and the at least one repetition.

23. The method of claim 22, wherein the attempting comprises first attempting to decode the data for the first service using only the original set of data for the first service.

24. The method of claim 23, wherein when the attempt to decode the data for the first service using only the original set of data for the first service is not successful, the receiving node attempts to decode the data for the first service using the original set of data for the first service and the at least one repetition of the original set of data for the first service.

25. The method of claim 22, wherein the received transmission includes the data for the first and second services interlaced in time or frequency so that the data for the first and second services does not overlap in time or frequency.

26. The method of claim 22, wherein the received transmission is a combination of transmissions from two transmitting nodes, wherein one of the two transmitting nodes is a first user equipment, and the data for the second service overlaps in time or frequency with the transmission by the first user equipment of the data for the first service.

27. The method of claim 22, wherein the determining the transmission includes data for the first and second services is based on an explicit indicator in the transmission.

28. The method of claim 27, wherein the explicit indicator includes information regarding a size of the original set of data and the at least one repetition.

29. The method of claim 27, wherein the explicit indicator includes information on how the original set of data and the at least one repetition are transmitted during the time period and at least a coding scheme employed to code the original set of data and the at least one repetition.

30. The method of claim 27, wherein the explicit indicator is only included in the original set of data.

31. The method of claim 27, wherein the explicit indicator is included in the original set of data and the at least one repetition.

32. The method of claim 22, wherein the determining the transmission includes data for the first and second services comprises:
performing channel equalization on the received transmission; and
determining whether, after channel equalization, different portions of the received transmission include a set of symbols having same signal values.

33. The method of claim 22, wherein the determining the transmission includes data for the first and second services is based on reconfiguration information received from a transmitting node via a transmission separate from the transmission of the data for the first and second services during the period of time.

34. The method of claim 22, wherein the first service is an Ultra-Reliable Low Latency Communication (URLLC) service and the second service is a Mobile Broadband (MBB) or enhanced MBB service.

35. The method of claim 22, wherein the time period is a transmission time interval (TTI), slot, or mini-slot of the second service.

36. The method of claim 22, wherein the original set of data for the first service and the at least one repetition are transmitted using frequency hopping so that the original set of data and the at least one repetition are transmitted using different sets of frequencies.

37. The method of claim 22, wherein the data for the first service is punctured into the data of the second service, and the original set of data for the first service and the at least one repetition of the original set of data for the first service are bundled and transmitted in the same time period when data for the second service is transmitted.

38. The method of claim 22, wherein the single transmission is a HARQ (Hybrid Automatic Repeat Request) transmission.

39. A transmitting node comprising a wireless transceiver and processing circuitry configured for:
determining data for a first service will be transmitted during a time period when data for a second service will be transmitted, wherein the data for the first service requires lower latency than the data for the second service;
determining transmission or reception conditions;
determining, based on the determined transmission or reception conditions, to adjust the transmission of the first service;
transmitting the data for the first service and the data for the second service in the same time period, wherein the transmission includes an original set of data for the first service and at least one repetition of the original set of data for the first service; and
receiving feedback from a receiving node regarding whether or not the receiving node successfully decoded the data for the first service, wherein the feedback is included in a single transmission and relates to both the original set of data and the at least one repetition.

40. The transmitting node of claim 39, wherein the transmitting node is a base station and the transmission of the data for the first and second services are interlaced in time or frequency so that the data for the first and second services does not overlap in time or frequency.

41. The transmitting node of claim 39, wherein the transmitting node is a first user equipment and a second user equipment transmits the data for the second service overlapping in time or frequency with the transmission by the first user equipment of the data for the first service.

42. The transmitting node of claim 39, wherein the adjustment of the transmission for the second service involves adjusting a transmission power or coding used for the transmission of the data for the first service.

43. The transmitting node of claim 39, wherein the original set of data for the first service and the at least one repetition of the original set of data for the first service are the same.

44. The transmitting node of claim 39, wherein the original set of data for the first service and the at least one repetition of the original set of data for the first service are coded differently.

45. The transmitting node of claim 39, wherein the original set of data for the first service and the at least one repetition of the original set of data for the first service are transmitted directly adjacent to each other in time within the time period.

46. The transmitting node of claim 39, wherein the original set of data for the first service and the at least one repetition of the original set of data for the first service are separated in time within the time period so that data for the second service is transmitted in time between the original set of data for the first service and the at least one repetition of the original set of data for the first service.

47. The transmitting node of claim 39, wherein the wireless transceiver and processing circuit are configured for including an explicit indicator of presence of the at least one repetition of the original set of data for the first service in the transmission during the time period.

48. The transmitting node of claim 47, wherein the explicit indicator includes information regarding a size of the original set of data and the at least one repetition.

49. The transmitting node of claim 47, wherein the explicit indicator includes information on how the original set of data and the at least one repetition are transmitted during the time period and at least a coding scheme employed to code the original set of data and the at least one repetition.

50. The transmitting node of claim 47, wherein the explicit indicator is only included in the original set of data.

51. The transmitting node of claim 47, wherein the explicit indicator is included in the original set of data and the at least one repetition.

52. The transmitting node of claim 39, wherein the wireless transceiver and the processing circuit are configured for providing a receiving node with reconfiguration information via a transmission separate from the transmission of the data for the first and second services during the period of time.

53. The transmitting node of claim 39, wherein the original set of data for the first service includes a control portion and a user data portion and the at least one repetition of the original set of data for the first service repeats the user data portion but not the control portion of the original set of data for the first service.

54. The transmitting node of claim 39, wherein the first service is an Ultra-Reliable Low Latency Communication (URLLC) service and the second service is a Mobile Broadband (MBB) or enhanced MBB service.

55. The transmitting node of claim 39, wherein the original set of data for the first service and the at least one repetition are transmitted using frequency hopping so that the original set of data and the at least one repetition are transmitted using different sets of frequencies.

56. The transmitting node of claim 39, wherein the time period is a transmission time interval (TTI), slot, or mini-slot of the second service.

57. The transmitting node of claim 39, wherein the determining, based on the determined transmission or reception conditions, to adjust the transmission of the first service is performed automatically by the transmitting node which activates puncture bundling so that the data for the first service is punctured into the data of the second service, and the original data for the first service and the at least one repetition of the original set of data for the first service are bundled and transmitted in the same time period when data for the second service is transmitted.

58. The transmitting node of claim 39, wherein the single transmission is a HARQ (Hybrid Automatic Repeat Request) transmission.

59. A receiving node comprising a wireless transceiver and processing circuitry configured for:
receiving a transmission during a time period;
determining the transmission includes data for a first service and data for a second service, wherein the data for the first service requires lower latency than the data for the second service;
determining the transmission includes an original set of data for the first service and at least one repetition of the original set of data for the first service;
attempting to decode the data for the first service; and
transmitting feedback to a transmitting node regarding whether or not the receiving node successfully decoded the data for the first service, wherein the feedback is included in a single transmission and relates to both the original set of data and the at least one repetition.

60. The receiving node of claim 59, wherein the receiving node first attempts to decode the data for the first service using only the original set of data for the first service.

61. The receiving node of claim 60, wherein when the attempt to decode the data for the first service using only the original set of data for the first service is not successful, the receiving node attempts to decode the data for the first service using the original set of data for the first service and the at least one repetition of the original set of data for the first service.

62. The receiving node of claim 59, wherein the received transmission includes the data for the first and second services interlaced in time or frequency so that the data for the first and second services does not overlap in time or frequency.

63. The receiving node of claim 59, wherein the received transmission is a combination of transmissions from two transmitting nodes, wherein one of the two transmitting nodes is a first user equipment, and the data for the second service overlaps in time or frequency with the transmission by the first user equipment of the data for the first service.

64. The receiving node of claim 59, wherein the determining the transmission includes data for the first and second services is based on an explicit indicator in the transmission.

65. The receiving node of claim 64, wherein the explicit indicator includes information regarding a size of the original set of data and the at least one repetition.

66. The receiving node of claim 64, wherein the explicit indicator includes information on how the original set of data and the at least one repetition are transmitted during the time period and at least a coding scheme employed to code the original set of data and the at least one repetition.

67. The receiving node of claim 64, wherein the explicit indicator is only included in the original set of data.

68. The receiving node of claim 64, wherein the explicit indicator is included in the original set of data and the at least one repetition.

69. The receiving node of claim 59, wherein the wireless transceiver and processing circuitry, in determining the transmission includes data for the first and second services, are further configured for:
performing channel equalization on the received transmission; and
determining whether, after channel equalization, different portions of the received transmission include a set of symbols having same signal values.

70. The receiving node of claim 59, wherein the determining the transmission includes data for the first and second services is based on reconfiguration information received from the transmitting node via a transmission separate from the transmission of the data for the first and second services during the period of time.

71. The receiving node of claim 59, wherein the first service is an Ultra-Reliable Low Latency Communication (URLLC) service and the second service is a Mobile Broadband (MBB) or enhanced MBB service.

72. The receiving node of claim 59, wherein the period of time is a transmission time interval (TTI), slot, or mini-slot of the second service.

73. The receiving node of claim 59, wherein the original set of data for the first service and the at least one repetition are transmitted using frequency hopping so that the original set of data and the at least one repetition are transmitted using different sets of frequencies.

74. The receiving node of claim 59, wherein the data for the first service is punctured into the data of the second service, and the original set of data for the first service and the at least one repetition of the original set of data for the first service are bundled and transmitted in the same time period when data for the second service is transmitted.

75. The receiving node of claim 59, wherein the single transmission is a HARQ (Hybrid Automatic Repeat Request) transmission.

\* \* \* \* \*